United States Patent [19]
Nishiishigaki

[11] Patent Number: 5,377,102
[45] Date of Patent: Dec. 27, 1994

[54] APPARATUS FOR PREPARING MAP DATA WITH REGIONAL PROPERTIES

[76] Inventor: Kenji Nishiishigaki, 955-5, Ameku, Naha-shi, Okinawa, 900, Japan

[21] Appl. No.: 25,984

[22] Filed: Mar. 3, 1993

[30] Foreign Application Priority Data

Mar. 5, 1992 [JP] Japan .................. 4-048706

[51] Int. Cl.$^5$ .................. G06F 15/62
[52] U.S. Cl. .................. 364/420; 364/449; 364/443; 364/450; 340/990; 340/995
[58] Field of Search .......... 364/420, 443, 449, 450, 364/512; 340/990, 995; 434/130, 147

[56] References Cited

U.S. PATENT DOCUMENTS

| | | | |
|---|---|---|---|
| 4,737,916 | 4/1988 | Ogawa et al. | 364/443 |
| 5,121,326 | 6/1992 | Moroto et al. | 364/449 |
| 5,150,295 | 9/1992 | Mattingly | 364/420 |

FOREIGN PATENT DOCUMENTS 2229886  3/1990  United Kingdom .

Primary Examiner—Roy N. Envall, Jr.
Assistant Examiner—Gita D. Shingala
Attorney, Agent, or Firm—Greer, Burns & Crain, Ltd.

[57] ABSTRACT

The line-data generating unit of this apparatus automatically reads a map image through an image scanner, generates a digital-image signal in a pattern-recognition module, prepares line data in a line-data image processing unit, and stores the line data in RAM (I). A data converter retrieves the line data from the line-data generating unit, prepares plane data, and issues the plane data to a property-data preparation unit. Through a closed-area-data image processing unit, the property-information preparation unit, based on instructions input from a keyboard, interpolates points of discontinuity in the plane data; assigns properties corresponding to such points, and prints the output. RAM (II) stores completed data. The interpolation of points of discontinuity in the plane data is performed jointly and simultaneously by input terminals PCi (i=1, 2, ..., n). Using this method, accurate plane data can be easily and rapidly prepared by reading an original topographical map or the like so that vector line-data is transformed into plane data whose points of discontinuity have been corrected-thus making the plane data completed and accurate.

2 Claims, 14 Drawing Sheets

D-FILE

M-FILE

APPARATUS FOR PREPARING MAP DATA WITH REGIONAL PROPERTIES

BACKGROUND OF THE INVENTION

1. Field of the Invention

The present invention relates to a method and apparatus for preparing a map data with regional properties, and more particularly to a method and apparatus that facilitates the preparation of map information that indicates the regional characteristics and properties of regions and points on the map.

2. Description of the Prior Art

Until now, maps have been used in various ways to indicate information graphically. Maps, presented in color have been widely used to indicate the properties of regions and spots wherein individual colors correspond to a particular property or characteristic. Such color maps include maps that show land-use conditions of fields, residential areas, industrial areas, and the like wherein the properties of the land are indicated by respective colors; regional maps of a nationwide census that illustrate different region in different colors; soil maps that depict different geological features in different colors administrative-district maps that show urban and rural prefectures, as well as cities, towns and villages in different colors; and, charts or maps that depict public utility systems for electricity, water supply, sanitation, and the like. These maps are widely used by local government as control data, and by school systems as educational material.

It is advantageous to store such map data in computers, because map information can then be updated relatively easily. Further, storing map data on computer also makes it possible to create new maps by overlapping maps that show different types of information for the same geographical area. For example, a map prepared by superimposing a regional map for planned road construction over a soil map is convenient for checking the soil conditions prior to beginning construction. Further, maps that contain the same type of information can be used to numerically grasp the degree of, say, environmental contamination and improvements thereof in a given area provided that the measurement results on the maps being superimposed were obtained at different times.

In one conventional used to store map information into a computer, the input terminal of a digitizer is first manually passed along the edges of a graphical form (which shows blocks and spots on an original map). In this way, motion data read by the input terminal is stored in the computer as plane data that outlines graphical forms for the various regions and points.

However, even when land-use maps of Japan's relatively small prefectures, (such as Okinawa and Tottori) are prepared on a scale of 1/25000, approximately 100,000 pieces of plane data are required. Since this plane data is manually input using the digitizer as described above, preparation of the data requires an enormous amount of time and labor.

Moreover, in order to assign properties corresponding to the plane data thus input for each individual region and point through computer processing, each item of plane data must form a closed plane. If the boundary (outline) obtained by the plane data is interrupted, the properties corresponding to this plane data flow out of such interrupted point to the periphery. On the other hand, even if an operator feels that the outline of the plane data displayed on a computer screen is continuous, the computer in fact often registers a discontinuity in the data. Consequently, the operator must be extremely careful when manually inputting plane data using the above mentioned digitizer technique, taking care to avoid the generation of discontinuities. As a result, such inputting operations require highly-skilled operators and sophisticated procedures.

For the above reasons, it is said that a 50% to 90% of the preparation costs of map information are allotted to manual labor. And because maps prepared in this way are very expensive, the wide application of map information to various fields is economically difficult.

In addition, since it may take as much as several months to complete the plane data, when used as control data, such plane data tends to be outdated.

For contour maps as widely used in civil engineering and surveying, there is a conventional apparatus for automatically compensating for distortions in graphical forms. The method works picking up the original map data, such as that used for topographical maps through an image scanner, and then storing the graphical form data in a computer. With this system, it is possible to update graphical form data relatively easily using manual input operations. However, with this apparatus, there is no concept of the above-mentioned plane data applied to the graphic data to be processed. Consequently the graphical form data is processed as vector data which merely represents lines. Another drawback of this system is that it does not allow one to automatically detect points discontinuity. In addition, if houses and roads are individually recognized after the graphical form data thus stored are transformed into vector data, and further if an object to be recognized through such vector data classification is, for example, a pair of adjacent houses, each of which is hexagonal in shape, it is impossible to identify one of the adjacent houses because the outline of the house cannot be divided into six items of line data and such items cannot be automatically transformed into vector data so as to combine as a single polygon. In this case, it is necessary for the conventional apparatus to prepare a traced drawing in which the pieces adjacent to each other are previously removed. Doing so entails much time and labor.

As described above, the prior art does not provide for method or apparatus for preparing map information from original maps precisely or automatically.

SUMMARY OF THE INVENTION

The present invention aims at providing a method and apparatus for automatically preparing map data with regional properties at a high speed by reading the original map, preparing plane data, and allotting regional properties to the plane data.

In the present invention, two-dimensional vector data is first prepared from raster data obtained by reading an original map, such as a topographical map plane data, which is constructed of at least point data and line data, is then automatically prepared from such vector data; next, another set of line data, corresponding to any other desired batches of point or line data, is generated from a point of discontinuity of the line data forming the plane data thus prepared; in this way, closed-area data corresponding to this plane data is prepared, stored, displayed, and printed together with property data corresponding to this closed-area data.

To realize the above, a line-data output means issues two-dimensional vector line data based on the raster data which is obtained by automatically reading the topographical and other original map. This line-data output means may comprise, for example, an image scanner, a pattern-recognition module, a line-data image processing unit RAM (Random Access Memory).

A plane-data output means issues plane data that consists of at least point and line data based on the vector line data issued from the line-data output means. This plane-data output means may comprise, for example, a CPU (Central Processing Unit) and ROM (Read Only Memory).

A closed-area data output means issues closed-area data that is formed by generating line data (which connects to any other point or line data) from the point of discontinuity of the line data forming the plane data issued from the plane-data output means. The closed-area data output means may comprise, for example, a personal computer.

A map-data generating means classifies the closed-area data (which is issued from the above closed-area data output means) by the property data thus input and allotted. The closed-area data is then stored, displayed, and printed by the map-data generating means. This map-data generating means may comprise, for example, an image processing unit, RAM, a keyboard, a display unit, and a plotter.

Finally, a control means issues the plane-data (which is issued from the plane-data output means) to a number of closed-area data output means after predetermined display data is allotted to interrupted-point data of the line data that forms the above plane data. The control means also issues the closed-area data (which is issued from the plurality of the closed-area data output means) to the map-data generating means. The above control means may comprise, for example, a CPU, ROM in which a program is stored, and other devices.

DESCRIPTION OF THE PREFERRED EMBODIMENTS

Embodiments of the present invention will be described below in detail with reference to the accompanying drawings.

Figure 1:
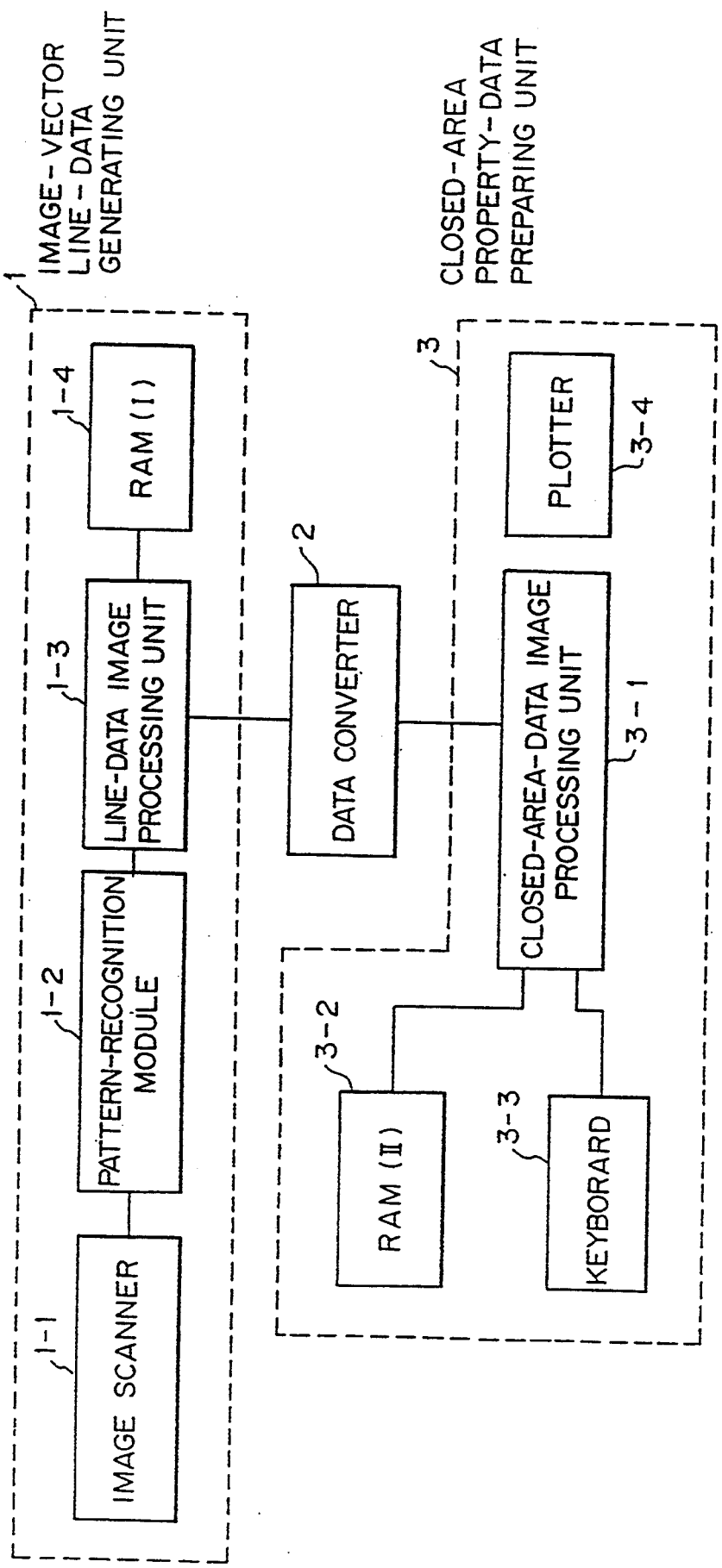
FIG. 1 is a block diagram that shows an embodiment of the present invention.

FIG. 1 is a block diagram of an embodiment of the present invention.

Figure 6A:
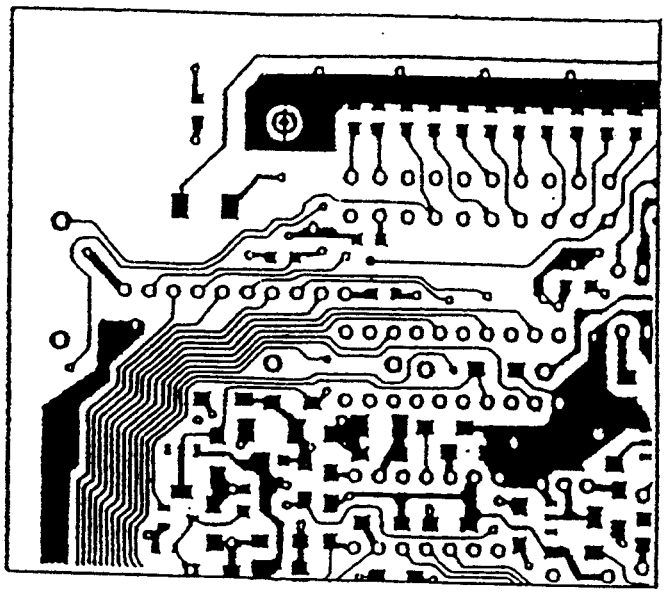
FIG. 6A is a view that shows an example of image information that the image-vector line-data generating unit 1 has read.
Figure 6B:
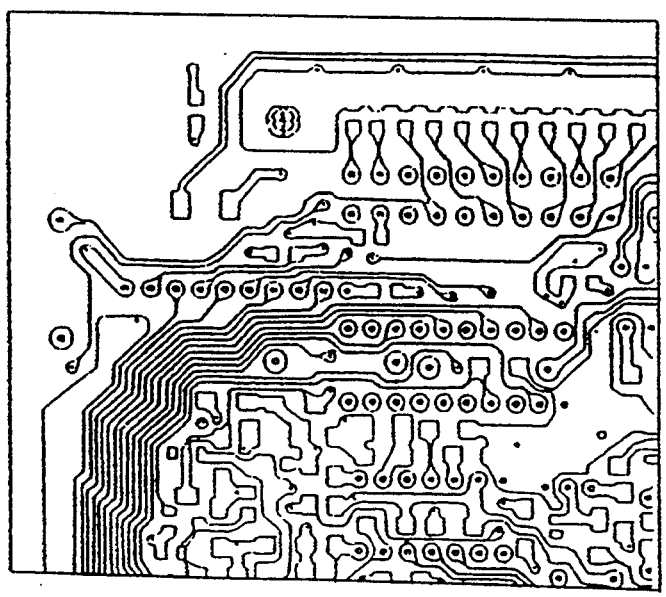
FIG. 6B is a view that shows an example of a graphical form in which the line data having been generated on the basis of the above image information is drawn.

In FIG. 1, an image-vector line-data generating unit 1 is constructed of: an image scanner 1-1 that automatically reads an original map, such as a topographical map or a circuit-diagram like that shown in FIG. 6A, and then issues an electrical signal; a pattern-recognition module 1-2 that receives the electrical signal issued from the image scanner 1-1 and generates a digital-image signal from the electrical signal thus received; a line-data image processing unit 1-8 that generates vector line data by extracting fine-line data from the digital-image signal—said signal having been generated by the pattern-recognition module 1-2,—and prepares, for example, the line-data image shown in FIG. 6B; and, RAM (I) 1-4, which stores the vector line data (which has been prepared by the line-data image processing unit 1-3) as the L-file 2a for line-data image processing, which will be described later.

The data converter 2 has its input side connected with the image-vector line-data generating unit 1, and has its output side connected with the closed-area property-data preparing unit 3. The L-file 2a for line-data image processing is retrieved from the image-vector line-data generating unit 1. Then, line data of the L-file thus retrieved 2a is analyzed and issued as D-file 2b line data for closed-area-data image processing (which will be described later) to the closed-area property-data preparing unit 3.

The closed-area property-data preparation unit 3 consists of a closed-area-data image processing unit 3-1; RAM (II) 3-2, in which the D-file 2b for closed-area-data image processing is stored; RAM (II) 3-2, which connects to the closed-area-data image processing unit 3-1; a keyboard 3-3, through which commands are input to execute interpolation of the line data in the D-file 2b for closed-area-data image processing, to allocate property to corresponding regions or points, to print the output and so forth and, a plotter 3-4 which prints the map information on the basis of print output data issued from the closed-area-data image processing unit 3-1.

Figure 2:
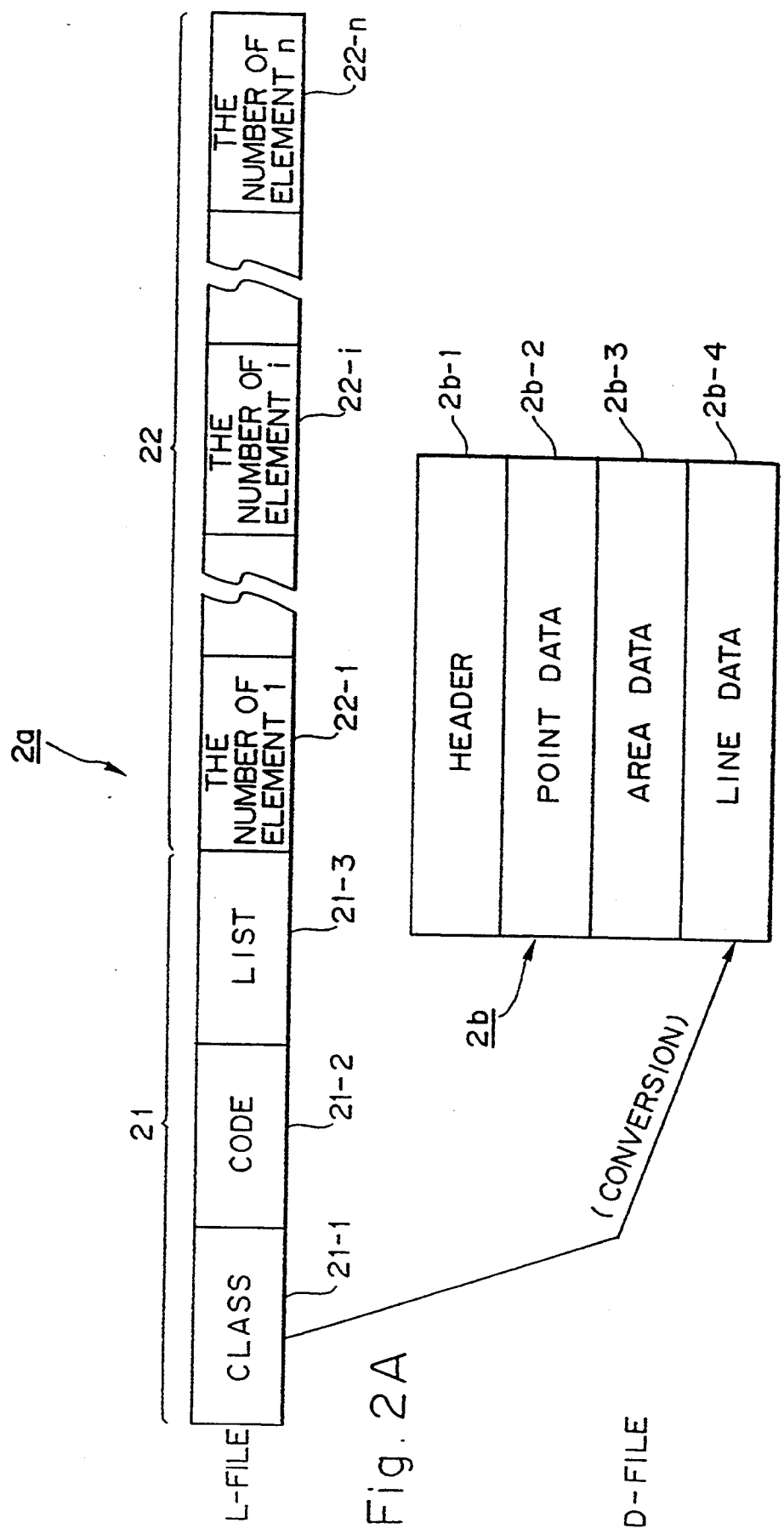
FIG. 2A is a block diagram of data in an L-file 2a for line-data image processing of a unit 1 that generates image-vector line-data.
FIG. 2B is a block diagram of data in a D-file 2b for closed-area-data image processing of a unit 3 for preparing closed-area.

FIG. 2A is a block diagram of the L-file 2a for line-data image processing, the L-file 2a being stored in the RAM (I) 1-4 of the image-vector line-data generating unit 1. FIG. 2B is a block diagram of the D-file 2b for closed-area-data image processing, the D-file 2b being stored in the RAM (II) 3-2 of the closed-area property-data preparation unit 3.

Figure 14A:
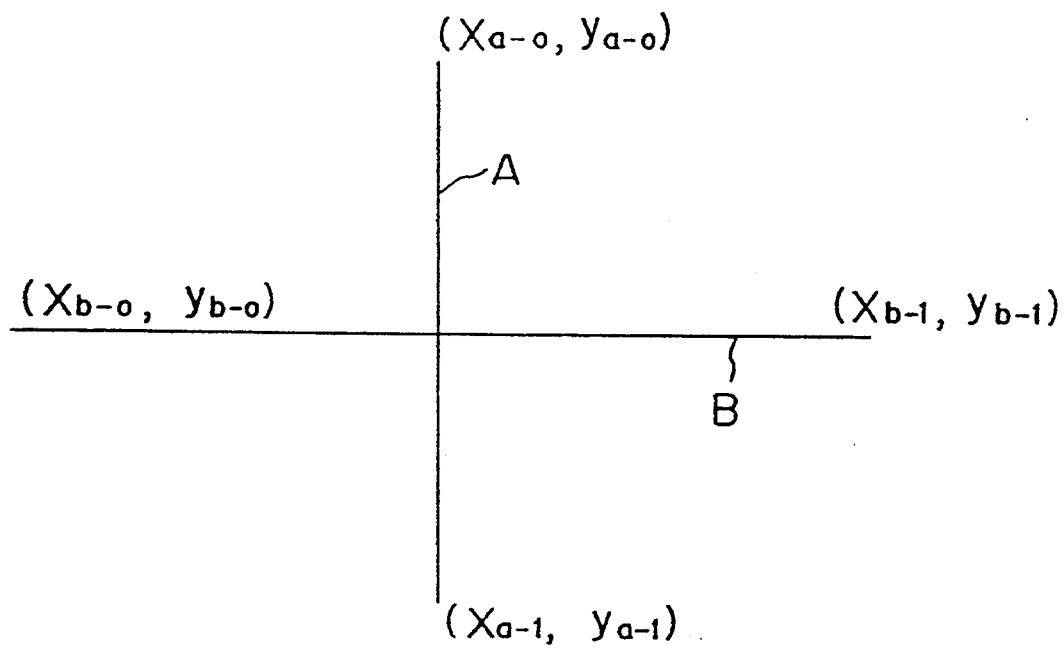
FIGS. 14A and 14B are views illustrating the line data.
Figure 14B:
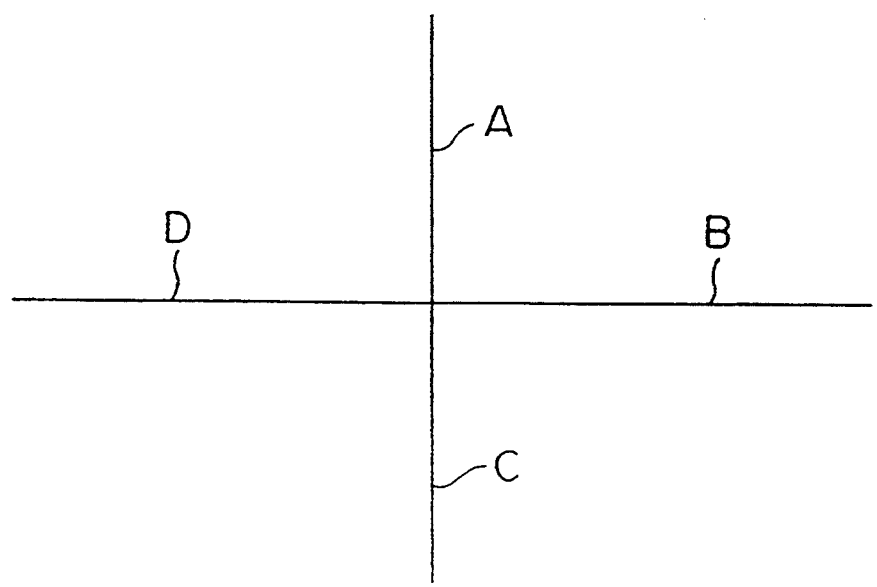

The L-file 2a for line-data image processing of FIG. 2A consists of one record data. This record represents a line that separately shows a contour or outline of an image, and consists of a header portion 21 and a data portion 22. The header portion 21 consists of a class portion 21-1 for showing the record's class; a code portion 21-2, for showing the configuration and the like of a line indicated by the record; and, a list portion 21-3 for showing the length of the data portion 22. The data portion 22 consists of a parameter portion (i) 22-i (i=1, 2, ..., n) for storing coordinate data which represents a line. In this line data, lot example, the cross image shown in FIG. 14A may be represented by two sets of line data (lines A and B), wherein line A connects a point (xa-0, ya-0) and a point (xa-1, ya-1), and line B connects a point (xb-0, yb-0) and a point (xb-1, yb-1). Further, as shown in FIG. 14B, it is also possible to divide the line at an intersection point of the cross image into four pieces of line data (lines A, B, C and D). Moreover, the line data may also be represented by dashed lines, AB and DC.

The line-data image processing unit 1-5 may, as needed, sequentially retrieve the L-file 2a for line-data image processing from the RAM (I) 1-4, and issue a graphical form, such as that shown in FIG. 6B, as data.

Further, the D-file 2b for closed-area-data image processing of FIG. 2B is quite different in file construction from the L-file 2a for line-data image processing of FIG. 2A, and has the same construction as that of, for example, a DLG file for handling the closed-area data. Namely, the D-file 2b for closed-area-data image processing of FIG. 2B consists of a header portion 2b-1 for storing data that indicates the file construction; a point-data portion 2b-2 for storing point data that indicates a bend or bent point of the polygonal line, and a line terminal thereof; an area-data portion 2b-3 for storing data that indicates at least one of the properties of the closed area and, a line-data portion 2b-4 for storing the line data.

Figure 3:
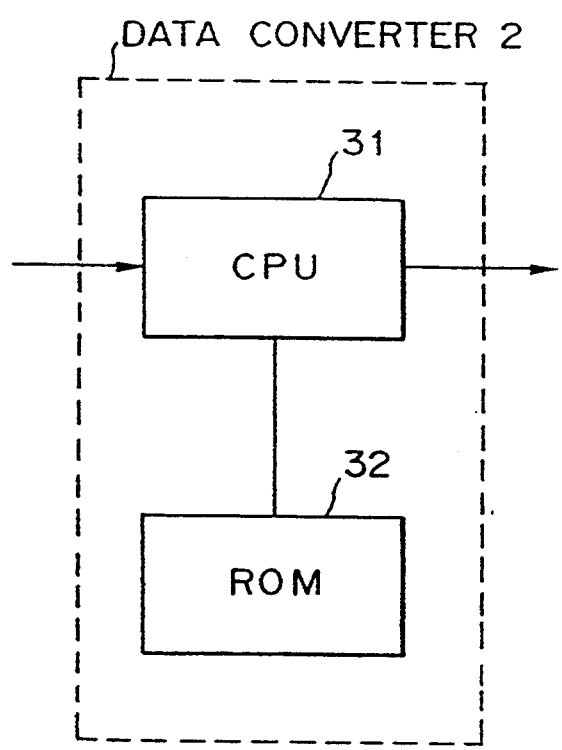
FIG. 3 is a block diagram that shows an internal construction of a data converter.

Next, the internal structure of the data converter 2 is shown in FIG. 3. As shown in FIG. 3, the data converter 2 comprises a CPU 31 with microprocessor and ROM 32, in which a program is stored. Based on the program stored in the ROM 32, the CPU 31 transforms a data of the L-file 2a for line-data image processing into the D-file 2b for close-area-data image processing.

Now, using the flowcharts shown in FIGS. 4 and 5, the operating procedures and data flow within the CPU 31 (which transforms the data of the L-file 2a for line-data image processing into the D-file 2b for closed-area-data image processing) will be described. Incidentally, the operating procedures and data flow are realized using registers i and j (not shown).

Figure 4:
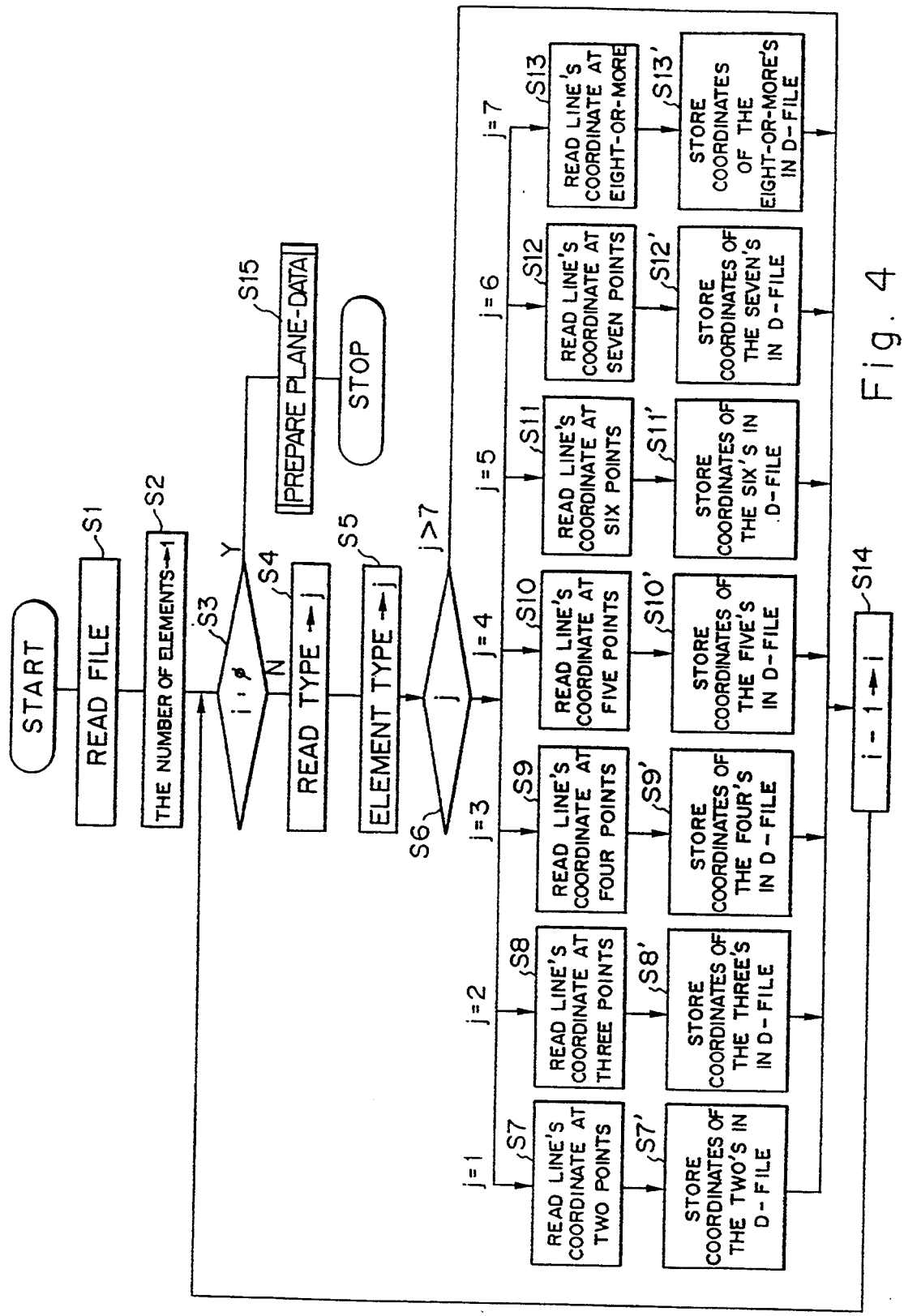
FIG. 4 is an operating flowchart (Part 1) that shows the steps used to prepare the D-file 2b for the closed-area-data image processing of the CPU.
Figure 5:
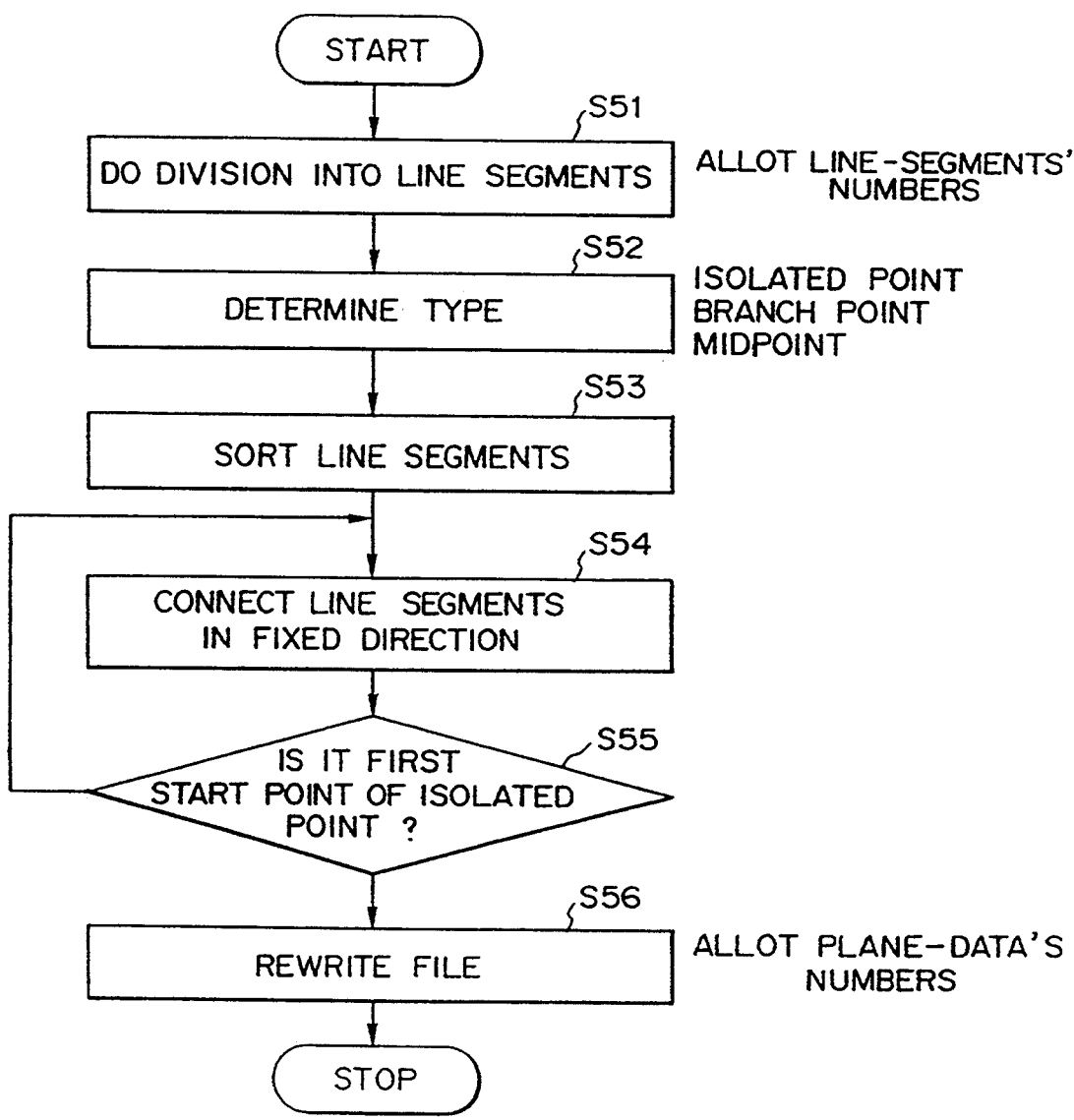
FIG. 5 is an operating flowchart (Part 2) that shows the steps used to prepare the D-file 2b for the closed-area-data image processing of the CPU.

In FIG. 4, the L-file 2a for line-data image processing is first read in step S1, followed by step S2, in which the number of elements is retrieved from the list portion 21-3 of the file-header portion 21 and stored in the register i. Then, the value of the register i is determined. When the value is not "0", there is the element to be read so that a step S5 follows. In this step S5, an element record i is retrieved so that element data in the leading portion of element i is retrieved and stored in register j. Then, in step S6, the value of register j is determined.

When this value is any one of "1" to "7", steps S7 to S13 are executed, respectively. Coordinate data, which is stored in a second location subsequent to the element data in the element record i, is then retrieved. The coordinate data thus retrieved is transferred to the line data portion 2b-4 of the D-file 2b for closed-area-data image processing, and written into a predetermined location.

The values of register j, ranging from "1" to "7", represent a straight line, a single-bend polygonal line, a two-bend polygonal line, ..., a seven-bend polygonal line, and an eight-or-more beard polygonal line, respectively.

Further, in step S6, if the value of register j is more than "7", the element type indicates non-line data. In this case, step 14 immediately follows.

Next, in step S3, if the value of register i is "0", the entire the element record has already been retrieved, and thus, processing of one graphical form has been completed. In this case, step S15 follows, in which plane data is prepared. The procedures this routine are thereby completed.

Now, using the flowchart shown in FIG. 5, preparation processing of the plane data will be described. First, in step 51, the line date which prepared on the D-file 2b for closed-area-data image processing is retrieved, and divided into line segments through a division process. In this division process, the line data thus retrieved is divided points of contact with the remaining line data, and points of intersection through which the retrieved line data is crossed by the remaining line data) into line segments free from such points of contact and intersection. Line-segment numbers are then allotted to the line segments thus obtained.

Step S52 follows next. In step S52, the types of starting and end points of each of the line segments determined. Through this processing operation, the starting and end points of each of the line segments which have been divided at these points to produce line segments completely free from these points therein are classified as independent point (not connected to any line data), branch point (i.e., contact point) or midpoint (i.e., bends or bent points in the polygonal lines), and are then registered by category.

Next, in step S53, these line segments are sorted based on the starting and end points. Then, in a subsequent step S54, the line segments thus sorted are connected in a predetermined direction, either clockwise or counter-clockwise. If the end point of the line segment is a branch point, there are a number of line segments each of which has the same starting point. By previously orienting the above connecting direction in a certain direction, it is possible to automatically sort desired line segments which form common plane data from a number of line segments, and have such desired line segments connected with each other.

Then, in step S55, the point type of end point of the segment thus connected is determined. As a result, when the end point has the same coordinate as that of a starting point of the first line segment or is an isolated point having no subsequent line segment, connection processing of the line segments is completed so that a subsequent step S56 may follow.

In step S56, a plane-data number is allotted to the plane data constructed of a series of line segments thus connected. Such number-allotted plane data is then stored in the D-file 2b for closed-area-data image processing.

In the previous step S55, if the end point of the connected line segment has different coordinates, and therefore a different point type, from the starting point of the first line segment, and further is not an isolated point, the processing procedures in the flowchart return to step S54 to permit a subsequent line segment to be connected.

The closed-area-data image processing unit 3-1 of FIG. 1 may retrieve the plane data (which is transformed from the line data as described above and stored in the line-data portion 2b-4 of the D-file 2b for closed-area-data image processing) so as to have a graphical form of the map (such as that shown in FIG. 7) displayed on a CRT display unit (not shown).

Figure 7:
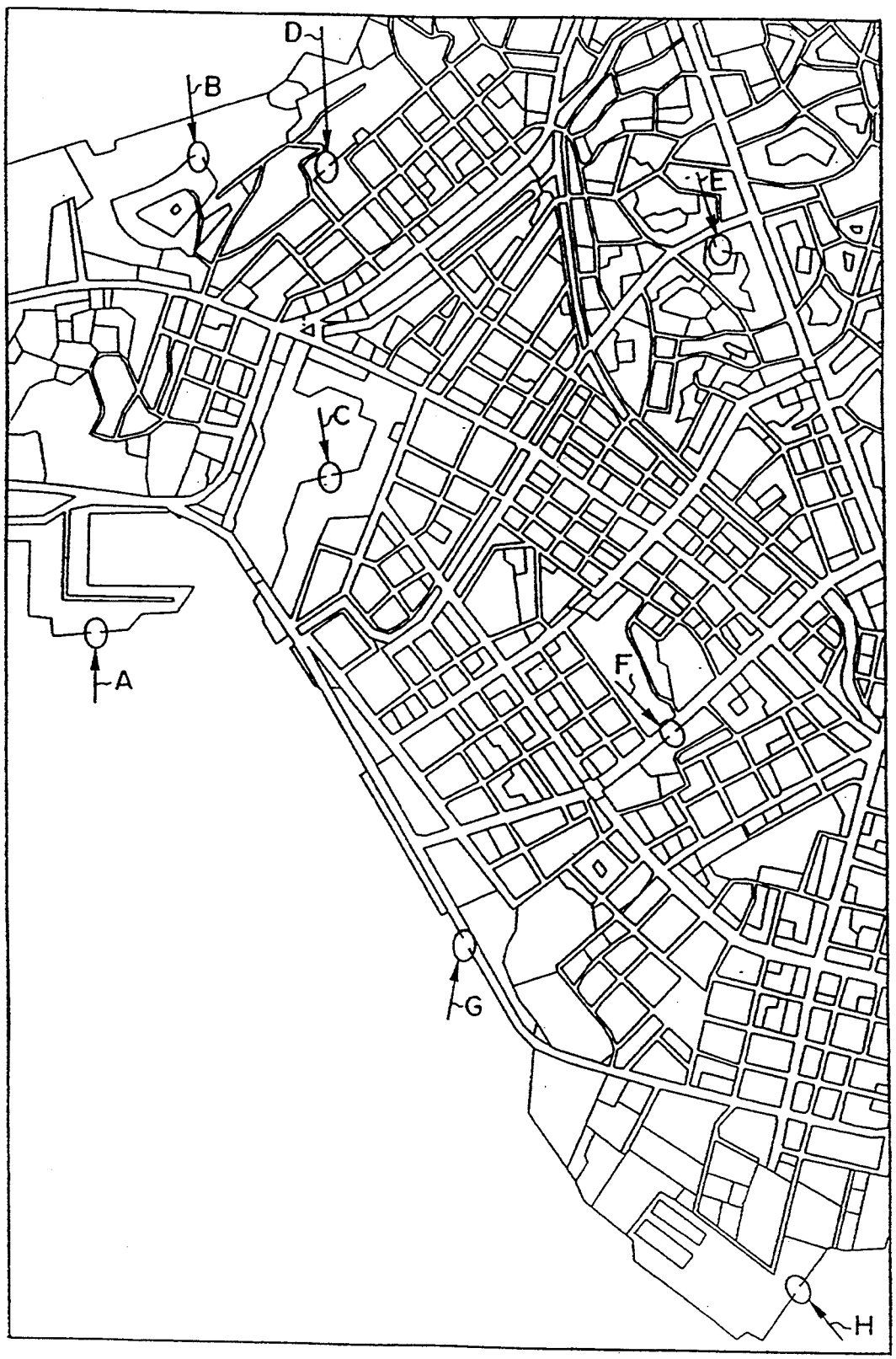
FIG. 7 is a view that shows an example of an unfinished graphical form of a map that has been prepared from the plane data issued to the closed-area property-data preparation unit 3.

In addition, the CRT display unit-may notify an operator by flashing a predetermined mark on each line discontinuity, the discontinuities being indicated in FIG. 7 by arrows A, B, . . . , F, respectively. The line discontinuities are eliminated by a correction process whereby line are made continuous using a mouse or the like, the mouse (not shown) being connected to a cursor key (not shown) a keyboard 3-3. The line data, which is thus transformed into correctly interpolated closed-area data, is again stored in the line-data portion 2b-4 of the D-file 2b for closed-area-data image processing. At the same time, corresponding point data in the point-data portion 2b-2 of the same D-file is automatically corrected and stored again therein.

Figure 8:
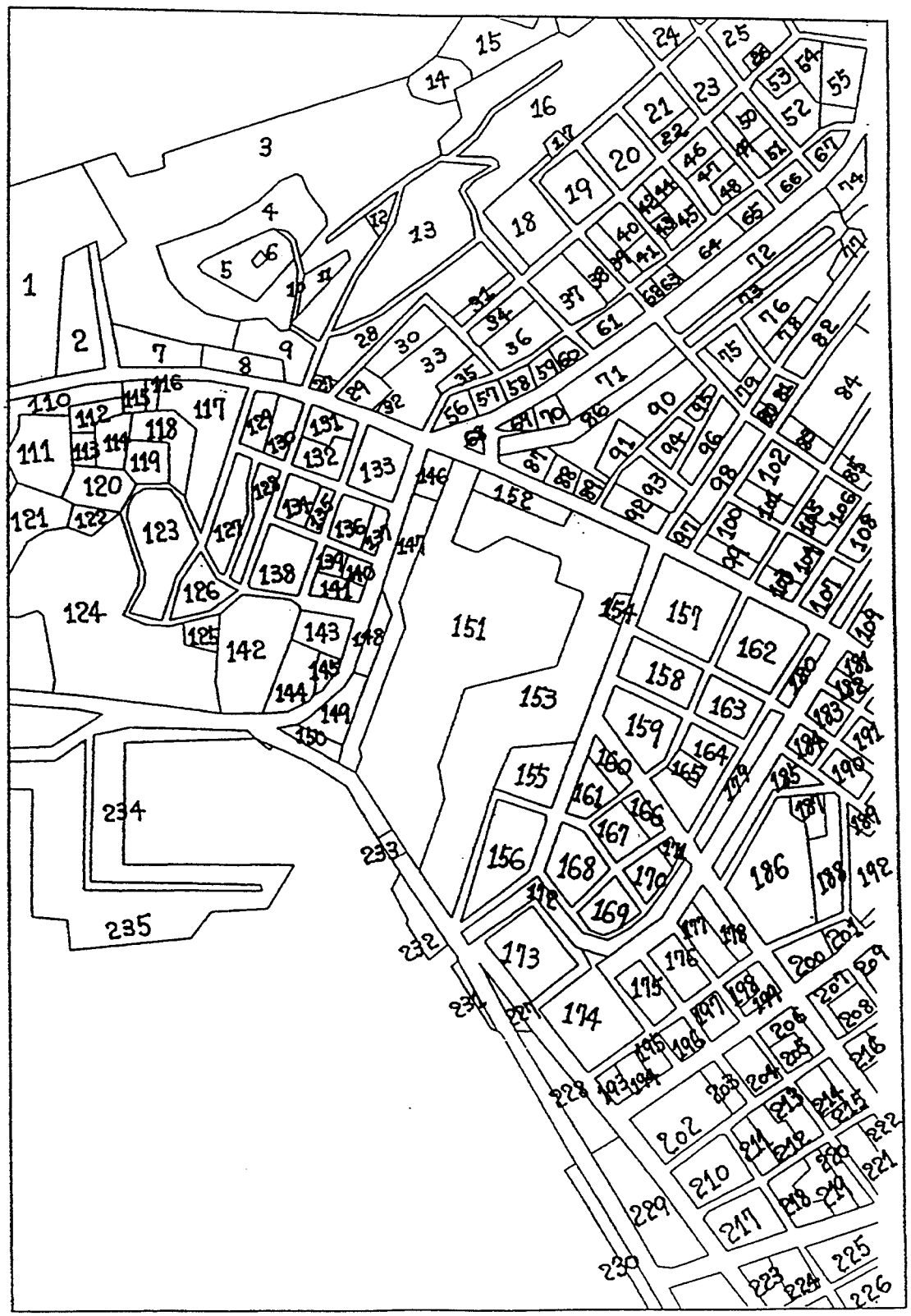
FIG. 8 is a view that shows an example of a completed graphical form of a map constructed from a number of areas that have been interpolated in portions of discontinuity and specified by numbers.
Figure 9:
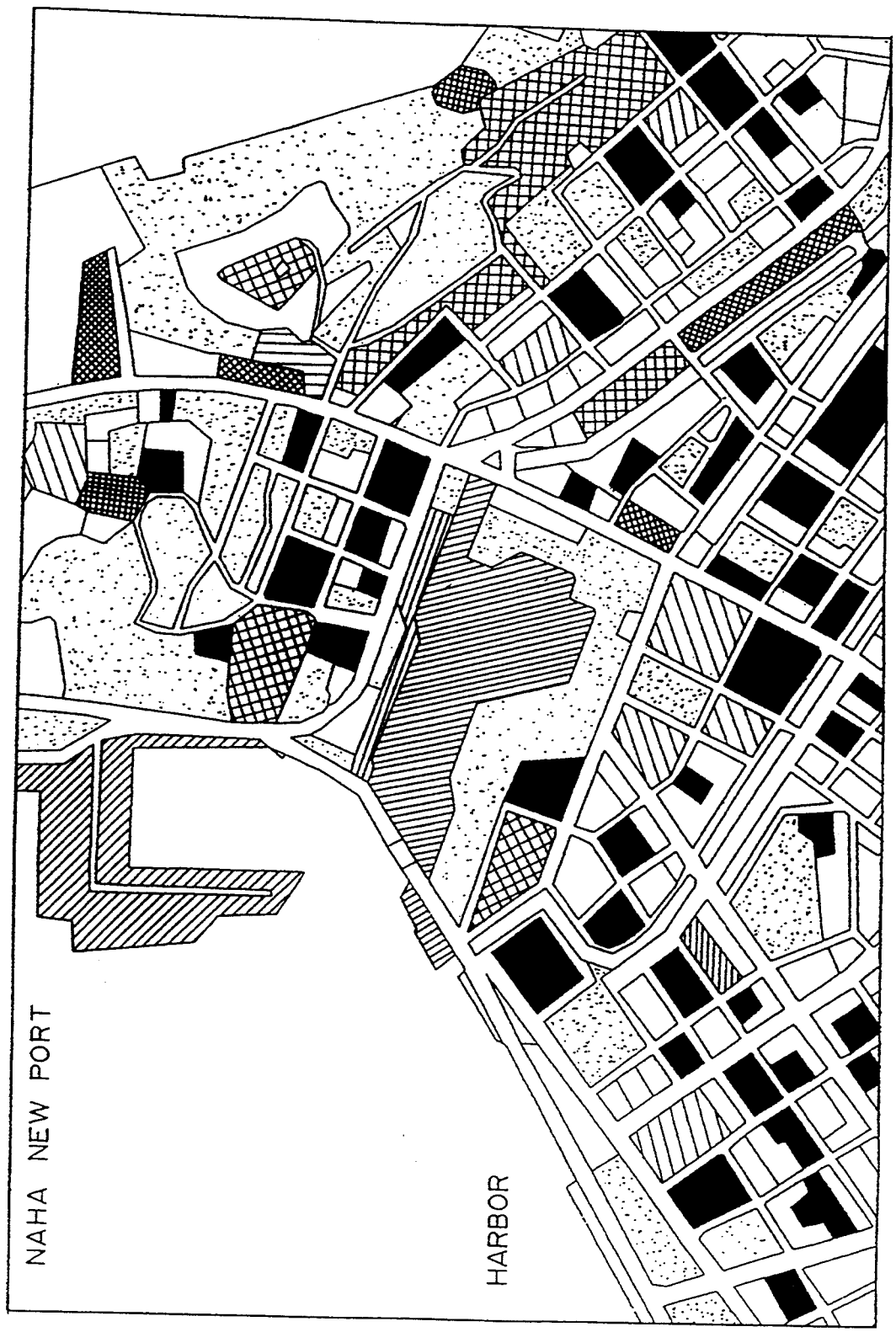
FIG. 9 is a view that shows an example of map information completed by allotting the regional properties to the thus specified areas.

In order to specify the individual regions and points (which are shown in closed areas consisting exclusively of graphical form data map as prepared in the above using the keyboard 3-3, numbers (such as those shown by circles in FIG. 8) are automatically and sequentially allotted to these closed areas of the map as an undivided whole. Such numbers are stored in corresponding locations of the area-data portion 2b-3 of the same D-file 2b. Further, by inputting data indicating the regional properties, such regional properties are allotted to each of specified regions and points. Such property data is also stored in the corresponding locations of the area-data portion 2b-3 of the same D-file 2b, so that predetermined map information is completed.

The thus prepared D-file 2b for closed-area-data image processing of the RAM (II) is retrieved by the closed-area-data image processing unit 3-1 of FIG. 1, and output through the plotter 3-4 as map information. The image thus output may, for example, take the form of a land-use condition map such as that shown in FIG.

As described above, the present invention can accomplish such preparation of map information within a few days, whereas using the prior art several months may be required.

In the above embodiment of the present invention, the interpolation process used to fill discontinuities in the defective graphical map data is performed by using the closed-area property-data preparation unit 3. However, even when preparing a land-use maps for relatively narrower prefectures (such as OKINAWA or TOTTORI) approximately 100,000 pieces of plane data are needed. Moreover, several tens of display pictures are required for correcting the input data. If several tens of pictures are corrected using only one unit, too much time is required to enjoy the drastic reduction in operation time accomplished by automating the plane-data preparation step.

Consequently, it is possible to drastically reduce the operation time required for such correcting operations by employing a plurality of correction-data input units simultaneously such tat the correction process is divided into a plurality steps corresponding to a number of correction-data input units and processed therein. In this way, correct graphical form map data is obtained and reinput into the closed-area property-data preparation unit 3, whereby a subsequent property-allotment step is performed by the same unit 3. This is realized in the following second embodiment of the present invention.

A second embodiment of the present invention, which realizes the above concept, is described below.

Figure 10:
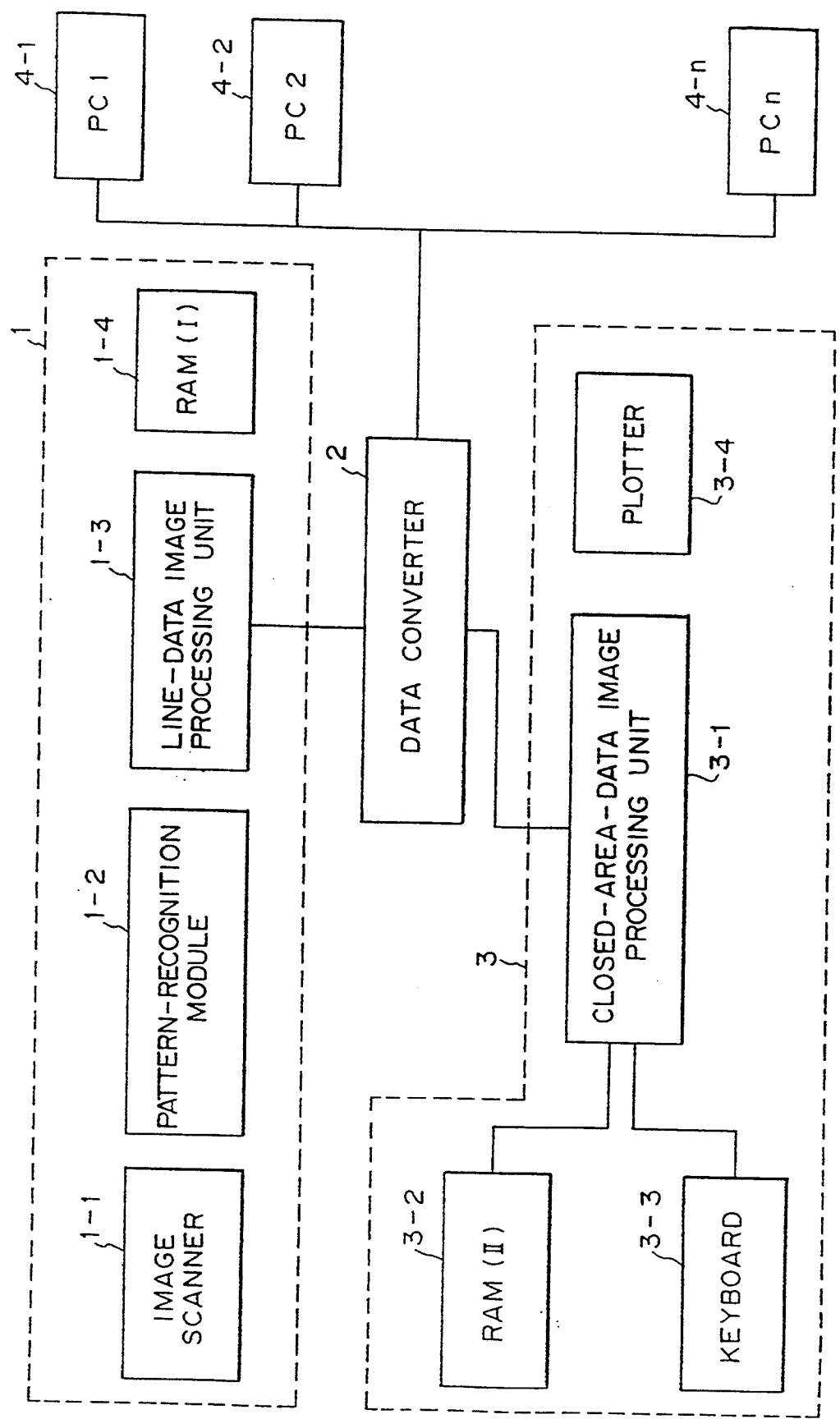
FIG. 10 is a block diagram that shows a second embodiment of the present invention.

FIG. 10 is a block diagram of the second embodiment of the present invention, wherein the same parts as those of the first embodiment of the present invention shown in FIG. 1 are denoted by the same reference numerals as those applied to the parts of the first embodiment.

In FIG. 10, the data converter 2 is connected with a plurality of personal computers 4-1 (PC1), 4-2 (PC2), . . . , 4-n (PCn). Of course, it is also possible to use a plurality of conventional terminal units in place of such personal computers.

From the D-file 2b for closed-area-data image processing, which file 2b is prepared based on the L-file 2a for line-data image processing which file a is issued from the image-vector line-data generating unit 1, the data converter 2 prepares an M-file 2c for closed-area-data correction processing divides the same into a plurality of data sets each of which corresponds to one display image, issues the thus divided data sets to a plurality of personal computers PCi (i=1, 2, . . . , n), and, issues data, which has already been corrected and issued from the personal computers PCi, to the closed-area property-date preparing unit 3 as the data of the D-file 2b for closed-area-data image processing.

Figure 11:
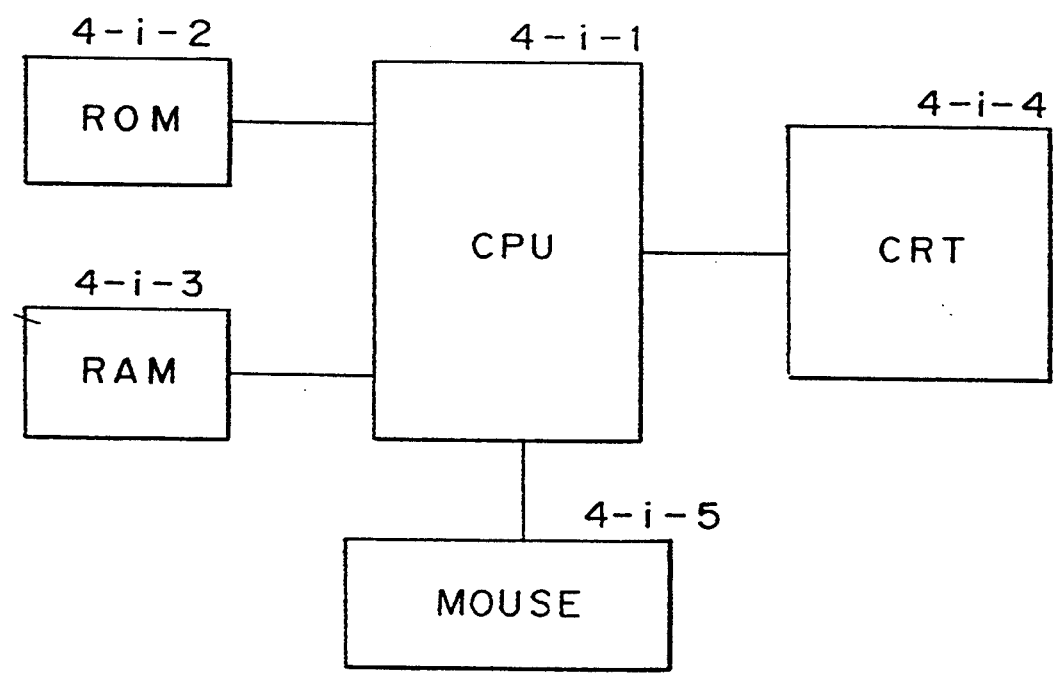
FIG. 11 is a block diagram that shows a construction of PCi (i=1, 2, ..., n)

FIG. 11 is a block diagram of the above personal computers PCi. In FIG. 11, CPU 4-i-1 comprises a microprocessor and controls the whole system on the basis of a program stored in ROM 4-i-2. ROM 4-i-3 comprises an M-file 2c for closed-area-data correction processing and a storage area for works. Based on a control instruction issued from the CPU 4-i-1, a CRT (i.e., a display unit with cathode-ray tube) 4-i-4 displays data (such as the graphical form of a map shown in FIG. 7) of the M-file 2c for closed-area-data correction processing of the RAM 4-i-3. A mouse 4-i-5 that controls a cursor on a desired point on the screen of CRT 4-i-4, makes it possible to input a coordinate value for said point.

Figure 12A:
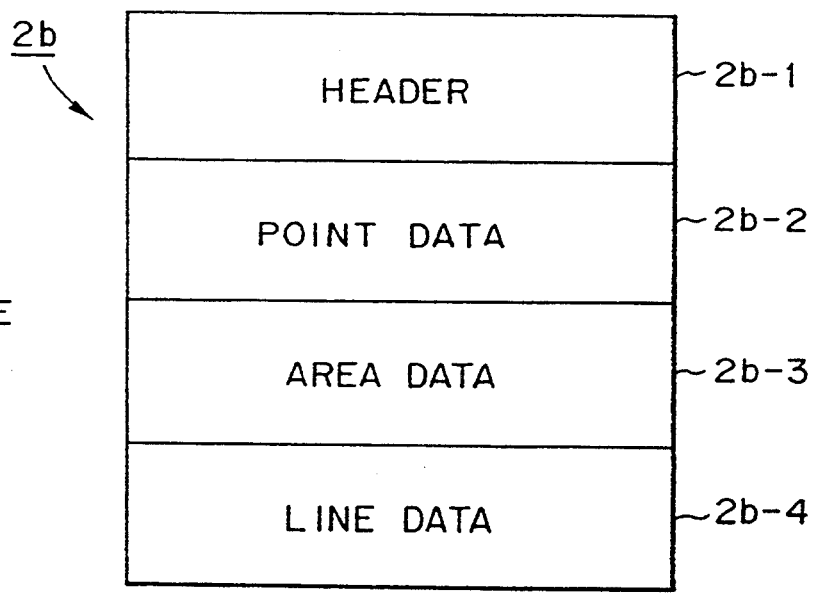
FIG. 12A is a view that shows the D-file 2b for closed-area-data image processing of the closed-area property-data preparation unit 3.
Figure 12B:
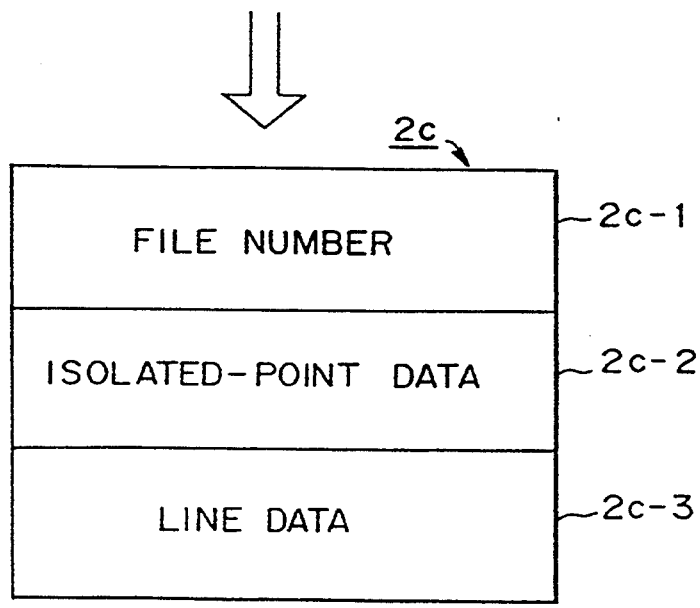
FIG. 12B is a view that shows data in an M-file 2c for closed-area-data compensation.

FIG. 12A shows the D-file 2b for closed-area-data image processing shown in FIG. 2B. FIG. 12B shows the data structure of the M-file 2c for closed-area-data correction processing, which file 2c is prepared on the basis of the D-file 2b for closed-area-data image processing described above.

In the same FIGS. 12A and 12B, the M-file 2c for closed-area-data correction processing consists a file-number portion 2b-1 that stores a file number for clarifying which D-file 2b is used in data retrieval; an isolated-point-data portion 2c-2 that stores predetermined data (such as for a small yellow circular mark) placed around the coordinate of an isolated point (a point of discontinuity) detected from the point data and the line data of the D-file 2b; and, a line-data portion 2c-4 that stores line data retrieved from the line data of the D-file 2b.

Now, as for the second embodiment of the present invention having the above construction, preparation processing of the M-file 2c for closed-area-data correction processing which operation is performed by the data converter 2 will be described with reference to the flowchart shown in FIG. 13.

Figure 13:
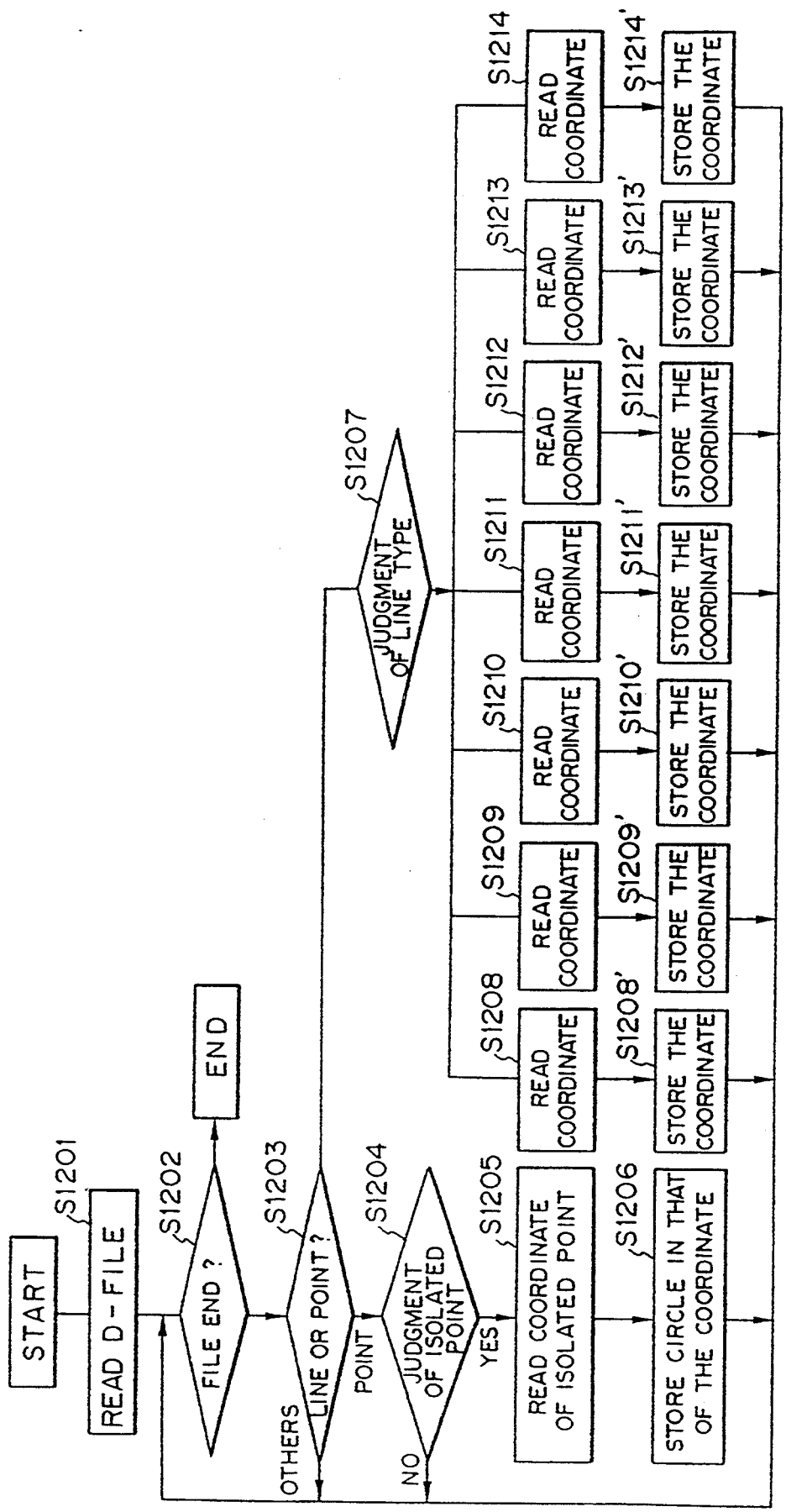
FIG. 13 is an operating flowchart that shows how an M-file 2c is prepared for closed-area-data compensation in the CPU.

In FIG. 13, in a step S1201, the D-file 2b closed-area-data image processing is first read so that a file number corresponding to the D-file 2b thus read is prepared on the basis of the data of the header portion 2b-1 and stored in the file-number portion 2c-1 of the M-file 2c for closed-area-data correction processing.

A subsequent step S1202 next determines whether the file is in "END". If the file is not in "END", step 1203 follows, whereby the data of the D-file 2b is subsequently read to determine whether the data thus read consists of point data (i.e., data retrieved from the point-data portion 2b-2 of the D-file 2b) or line data (i.e., data retrieved from the line-data portion 2b-4 of the D-file 2b).

If, through the above judgment, the data thus read is identified as point data, a step S1204 follows to determine whether the point data indicates an isolated point.

This judgment also determines whether the number of line data items which connects one item of point data with another is two or more than two. If the number of line data is two, the point data in question corresponds to a bend or bent point in a polygonal line. If the number of line data items is three or more, the point data in question represents a contact point (i.e., a convergent point or the starting point of diversion). Therefore, in both cases described above, the point data in question is not identified as that of the isolated point. And, if the number of line data items from the point data is only one, such point data is identified as that of an isolated point.

If the point data is judged to be that of an isolated point, a step S1205 follows such that the coordinates of the isolated point are read. After that, a step S1206 follows such that circle data, i.e., data for a circle (having the isolated point as its center and a predetermined radius, is prepared. The circle data is thus stored in the isolated-point-data portion 2c-2 of the M-file 2c for closed-area-data correction processing. Operation then returns to step S1202 described above.

If through the judgment performed in step S1204, the point data is not identified as that of an isolated point, operation immediately returns to the above step S1202.

If, through the judgment performed in he step S1203, the data read in step S1203 is determined to be line data, a step S1207 follows such that the line data is classified by type. In other words, the line data is classified as one of the following: a straight line (coordinate corresponding to a pair of points); a one-bend polygonal line (coordinates corresponding to three points); . . . ; a six-bend polygonal line (coordinates corresponding to seven points); or, an polygonal line with seven bends or more (coordinates corresponding to at least eight points). Based on this classification, step S1208, S1209, . . . , S1213, S1214 is executed such that the coordinates of the line data are read and step S1208', S1209', . . . , S1213', or S1214' follows respectively, whereby line data consisting of point-coordinate data thus read above is stored in the line-data portion 2c-3 of the M-file 2c for closed-area-data correction processing so as to permit the operation to return to step S1201.

If the file is at "END" in the above step 1202, the operation is terminated.

In the manner described above, the M-file 2c for closed-area-data correction processing is issued the personal computers PCi (i=1, 2, . . . , n), PC1, PC2, . . . , PCn shown in FIG. 10, and displayed on these computers. The operator identifies interrupted points, i.e., points of discontinuity in the graphical form of the map by means of circular marks that indicate where discontinuities occur. If a discontinuity is too small, making it too difficult for the operator to identify it, the point discontinuity may be enlarged on the display and taken care of using the mouse through a process of interpolation. Data thus interpolated is stored as new line data in the line-data portion 2c-3 of the M-file 2c for closed-area-data correction processing. After data correction is completed, the new line data is retrieved by the data converter 2 and issued to the closed-area property-data preparation unit 3.

The above two embodiments describe the preparation of the map data but the present invention is not limited to the map data. With regard to a circuit pattern shown in FIG. 6B, an attribute may be given to respective portions of the circuit pattern as closed-areas in a similar manner to the above embodiments, thereby coloring the respective closed-areas and then the respective closed areas may be easily distinguished from each other.

Any further embodiments, modifications and applications should be included in a spirit and scope of the present invention.

Although the present invention has been described in the above with reference to two embodiments, it should be clearly understood that additional embodiments—applications and modifications which are apparent to those skilled in the art—fall within the spirit and scope of the present invention.

What is claimed is:

1. An apparatus for preparing map data from an original map image, said apparatus comprising:
    a line generating unit including input means for automatically reading the original map image and line-data output means for issuing two-dimensional vector line-data from aster obtained by automatically reading said original map image;
    a data converting unit including plane-data output means for generating and issuing plane data on the basis of said vector line-data issued from said line-data output means;
    closed area image data generating means for generating connective line data for connecting points of discontinuity in said line data that forms plane data to other point or line data for making closed areas; and,
    a map data preparing unit for storing said closed areas as map data, and displaying and printing the map data as a new map image reformed from the original map image.

2. An apparatus for preparing man data, as set forth in claim 1, wherein:
    said closed-area image data generating means includes a number of closed-area data output means for completing said plane data as closed-area data by generating said corrective line data, said corrective line-data connecting said points of discontinuity in said vector line data forming said plane data to other point or line data; and,
    said plane-data output means generates and issues plane data on the basis of said vector line-data issued from said line-data output means by dividing said plane data into a plurality of pieces of plane data, allotting predetermined display data to discontinuous point data for the line data that forms each of said pieces of plane data, and issuing said pieces of plane data to each of said closed-area-data output means; and issues closed-area data to said map data preparing unit.

* * * * *

UNITED STATES PATENT AND TRADEMARK OFFICE
CERTIFICATE OF CORRECTION

PATENT NO. : 5,377,102
DATED : December 27, 1994
INVENTOR(S) : Nishiishigaki

It is certified that error appears in the above-indentified patent and that said Letters Patent is hereby corrected as shown below:

Column 2, line 21, after "works" insert --by--.

Column 4, line 36, delete "1-8" and insert --1-3--.

Column 5, line 17, delete "lot" and insert --for--.

Column 5, line 27, delete "1-5" and insert --1-3--.

Column 6, line 11, delete "beard" and insert --bend--.

Column 6, line 24, after "which" insert --is--.

Column 6, line 28, after "divided" insert --(at--.

Column 6, line 29, after "and" insert --at--.

Column 7, line 48, after "Fig." insert --9--.

Column 8, line 1, delete "tat" and insert --that--.

Column 8, line 24, delete "a" and insert --2a--.

Column 8, line 50, delete "128" and insert --12B--.

UNITED STATES PATENT AND TRADEMARK OFFICE
CERTIFICATE OF CORRECTION

PATENT NO. : 5,377,102
DATED : December 27, 1994
INVENTOR(S) : Nishiishigaki

It is certified that error appears in the above-indentified patent and that said Letters Patent is hereby corrected as shown below:

Column 8, line 56, after "consists" insert --of--.

Column 9, line 44, delete "he" and insert --the--.

Column 9, line 64, after "issued" insert --to--.

Column 10, line 35, delete "aster" and insert --raster data--.

Column 10, line 49, delete "man" and insert --map--.

Signed and Sealed this

Twenty-first Day of November, 1995

Attest:

BRUCE LEHMAN

*Attesting Officer*  *Commissioner of Patents and Trademarks*